United States Patent
Laing et al.

(10) Patent No.: US 9,863,279 B2
(45) Date of Patent: Jan. 9, 2018

(54) MULTIPURPOSE SUPPORT SYSTEM FOR A GAS TURBINE

(75) Inventors: Donald Gordon Laing, Houston, TX (US); Jose Francisco Estrada, Queretaro (MX); Gerardo Plata Contreras, Queretaro (MX); Mehdi Milani Baladi, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 736 days.

(21) Appl. No.: 13/546,998

(22) Filed: Jul. 11, 2012

(65) Prior Publication Data
US 2014/0013768 A1    Jan. 16, 2014

(51) Int. Cl.
*F01D 25/28* (2006.01)
*F02C 7/20* (2006.01)

(52) U.S. Cl.
CPC .............. *F01D 25/285* (2013.01); *F02C 7/20* (2013.01)

(58) Field of Classification Search
CPC .... F02C 7/20; F23R 3/283; F23R 3/60; F01D 25/285
See application file for complete search history.

(56) References Cited

U.S. PATENT DOCUMENTS

| | | | |
|---|---|---|---|
| 5,517,822 A * | 5/1996 | Haws | F01K 17/025 122/1 R |
| 7,461,510 B1 * | 12/2008 | Munson, Jr. | 60/796 |
| 8,057,140 B2 | 11/2011 | Entwistle | |
| 2007/0220895 A1 * | 9/2007 | Horner | F01D 25/24 60/772 |
| 2008/0003093 A1 * | 1/2008 | Brown et al. | 415/1 |
| 2010/0052288 A1 | 3/2010 | Doll et al. | |
| 2010/0095683 A1 | 4/2010 | Glynn et al. | |
| 2010/0162726 A1 | 7/2010 | Robertson et al. | |
| 2012/0312707 A1 * | 12/2012 | Baten | F01D 25/285 206/319 |

* cited by examiner

*Primary Examiner* — Craig Kim
(74) *Attorney, Agent, or Firm* — Fletcher Yoder, P.C.

(57) ABSTRACT

A system includes a gas turbine engine and a multipurpose gas turbine engine support frame couple to the gas turbine engine. The multipurpose gas turbine support frame is configured to support the gas turbine engine during both operation and transport of the gas turbine engine.

15 Claims, 6 Drawing Sheets

MULTIPURPOSE SUPPORT SYSTEM FOR A GAS TURBINE

BACKGROUND OF THE INVENTION

The subject matter disclosed herein relates to systems for supporting gas turbines for multiple purposes.

Gas turbines are used in many land and marine based applications. During overhaul (e.g., maintenance, repair, etc.) of the gas turbine engine, the gas turbine may need to be removed and/or transported from its location. This removal and/or transportation of the gas turbine may utilize transferring the gas turbine between different support frames during the various stages of overhaul. In addition, the various connections to the turbine may need to be connected and/or disconnected and the turbine realigned when reinstalled. All of these factors may increase the time of gas turbine exchange, leading to engine down time that may result in lost revenue.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a gas turbine engine and a multipurpose gas turbine support frame coupled to the gas turbine engine. The multipurpose gas turbine support frame is configured to support the gas turbine engine during both operation and transport of the gas turbine engine.

In accordance with a second embodiment, a system includes a multipurpose gas turbine support frame configured to couple to a gas turbine engine. The multipurpose gas turbine support frame is configured to support the gas turbine engine during at least operation, transport, and removal of the gas turbine engine.

In accordance with a third embodiment, a system includes a gas turbine engine and a multipurpose gas turbine support frame coupled to the gas turbine engine. The multipurpose gas turbine support frame is configured to support the gas turbine engine during both operation and transport of the gas turbine engine. Also, the system includes a tubular framework attached to the multipurpose gas turbine support frame. The tubular framework surrounds a portion of the gas turbine engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
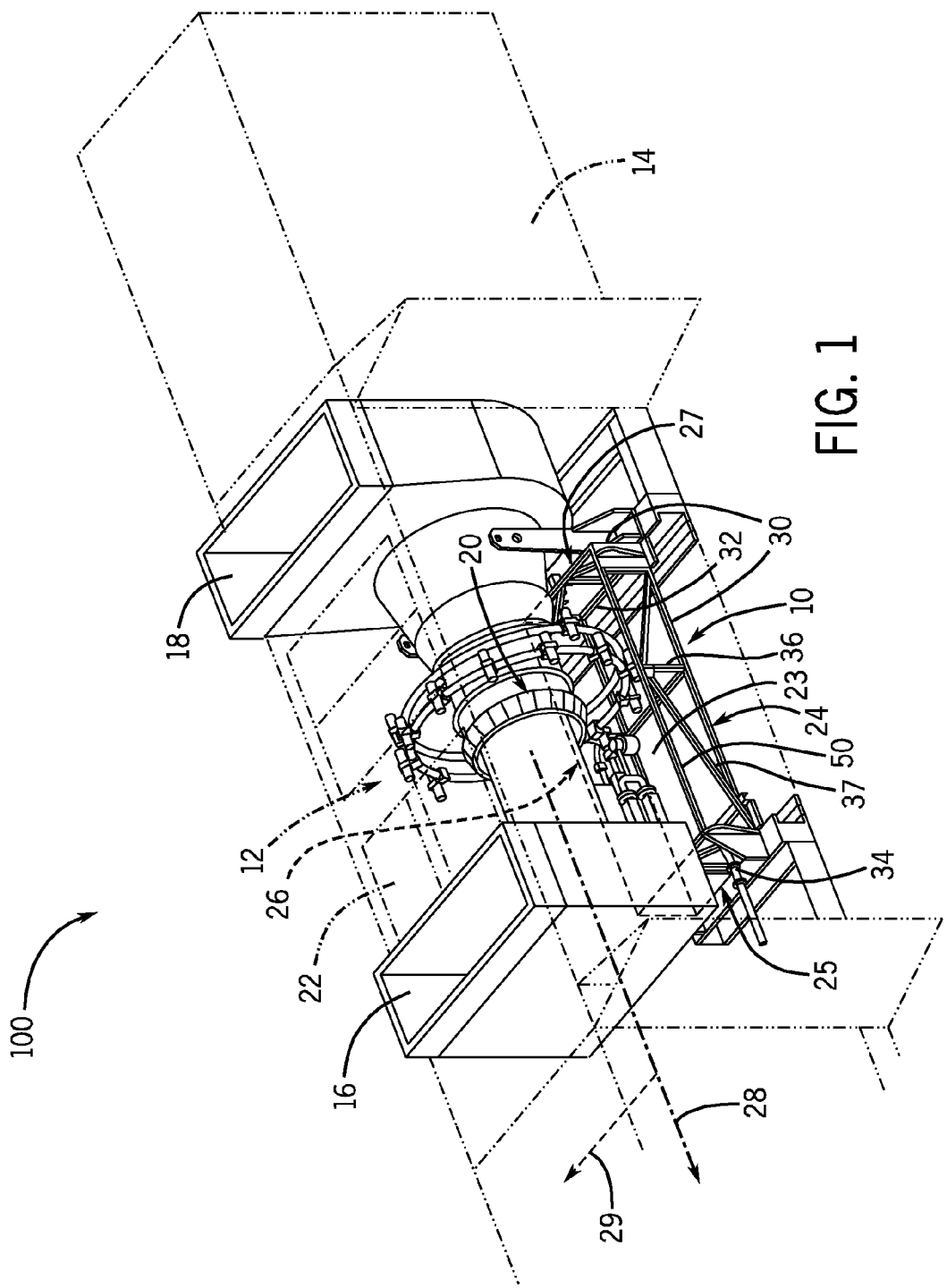
FIG. 1 is a schematic perspective view of an embodiment of a gas turbine generator, compressor, or pump having a multipurpose support frame for a gas turbine.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to systems for supporting a gas turbine engine during the multiple stages of overhaul. Specifically, the systems include a multipurpose gas turbine support frame. The multipurpose gas turbine support frame couples to the gas turbine to support the turbine engine during the initial assembly, operation and transport of the gas turbine engine. Also, the support frame may support the turbine engine during installation, removal and/or testing of the engine. The support frame may include at least one flexible support to restrain the turbine engine during operation. In certain embodiments, the support frame may include at least one rigid support to restrain the turbine engine when exposed to transport loads during transport of the turbine engine. Further, the systems include a removable gas fuel metering system that is coupled to the support frame and configured to travel with the support frame during transport and/or removal of the turbine engine. This reduces the time spent disconnecting and/or reconnecting the turbine engine during overhaul. The support frame may also include locating guides to enable installation and/or reinstallation of the turbine engine without aligning or realigning the gas turbine engine. In some embodiments, a tubular framework may be coupled to the support frame that surrounds a portion of the turbine engine. The tubular framework may enable independent separation and support of a gas generator portion and power turbine portion of the gas turbine. Using a multipurpose support frame eliminates multiple transfers of the turbine engine between support frames during the various stages of overhaul of the engine (e.g., removal, transport, etc.). The multipurpose support frame also enables a faster engine exchange during overhaul by reducing down time, while also minimizing revenue losses from the downtime.

FIG. 1 is a schematic perspective view of an embodiment of a gas turbine generator 100 having a gas turbine engine 20 coupled to a multipurpose gas turbine support frame 10 (e.g., support frame). Land based and marine based gas turbine power generation units 20 in many instances are driven continuously while connected to an electrical generator and power grid. Any time in which the gas turbine engine is not operating wastes valuable resources. As discussed below, the disclosed embodiments of support frames 10 decrease the amount of time required to assemble and install the gas turbine engine. Additionally, individual gas turbine units 20 undergo overhaul (e.g., repair, maintenance etc.) periodically which causes a loss of power and/or revenue. In order to minimize downtime for an individual gas turbine engine 20, the time it takes to exchange and reinstall the gas turbine should be minimized as well. As discussed below, the disclosed embodiments of support frames 10 include features that decrease the amount of time it takes to exchange the gas turbine from its place of operation.

The power generation unit 100 includes a gas turbine enclosure 12 that houses or encloses a gas turbine engine 20, and an electrical generator 14 driven by the gas turbine engine 20. The gas turbine enclosure 12 defines a first intake port 16 (e.g., first air intake port or turbine air intake), and a second exhaust exit port 18. In certain embodiments, the enclosure 12 includes a second air intake port 22 (e.g., ventilation air intake). The first intake port 16 is coupled to the gas generator portion of the gas turbine engine 20. The first intake port 16 directs air into the gas turbine engine 20. For example, the first intake port 16 may direct air into a compressor of the gas turbine engine 20. For example, the gas turbine engine 20 may compress the air from intake port 16, mix the air with fuel, and combust the air-fuel mixture to drive one or more turbines. The exit port 18 is coupled to an exhaust stack (not shown) for venting exhaust gases and/or ventilation air from the gas turbine engine 20 and/or enclosure 12. The gas turbine engine 20 includes a drive shaft that extends through the enclosure 12 and couples to the generator 14.

The multipurpose gas turbine support frame 10, in various embodiments, has applicability for any gas turbine, including both land and marine gas turbine power generation units. As illustrated, the support frame 10 includes a base 23 and multiple sides 24, 25, 26, 27. The sides 24, 25, 26, 27, and base 23 form a generally rectangular shape. For example, sides 24 and 26 extend parallel to a gas turbine axis of rotation 28 and with respect to each other. Sides 25 and 27 extend between the sides 24 and 26 crosswise (i.e., perpendicular) with respect to the axis of rotation 28 of the gas turbine 20 to form ends 32 and 34 of the frame 10. In other embodiments, the support frame 10 may form other shapes which may include sides that are not parallel to the gas turbine axis or perpendicular to each other. In further description of merely the illustrated embodiment, the sides 24, 26, 32 and 34 each include structural members 30 that include spaces or gaps to enable routing of electrical and fluid lines. Structural members 30 may extend in a radial direction 29 with respect to the gas turbine 20 and/or crosswise (i.e., perpendicular to an axis of rotation 28 of the gas turbine engine 20). For example, the structural members 24-27 of each side may include a pair of cross members 50. One of the pair of cross members 50 may be raised with respect to the other cross member 50. For example, the structural members 30 of each side 24-27 include raised supports 36, 37 that raise and/or support one cross member 50 of the pair of cross members 50 with respect to the other. Raised supports may extend either perpendicular 36 or angled 37 with respect to the cross members 50. The structural members 30 strengthen the support frame 10 so that it may withstand the gravitational and kinetic forces applied during the various stages of operation and overhaul. Strengthening of the support frame 10 is further enhanced by the cross members 50 and the raised supports 36. As described in greater detail below, some of the structural members 30 may be removable.

Figure 2:
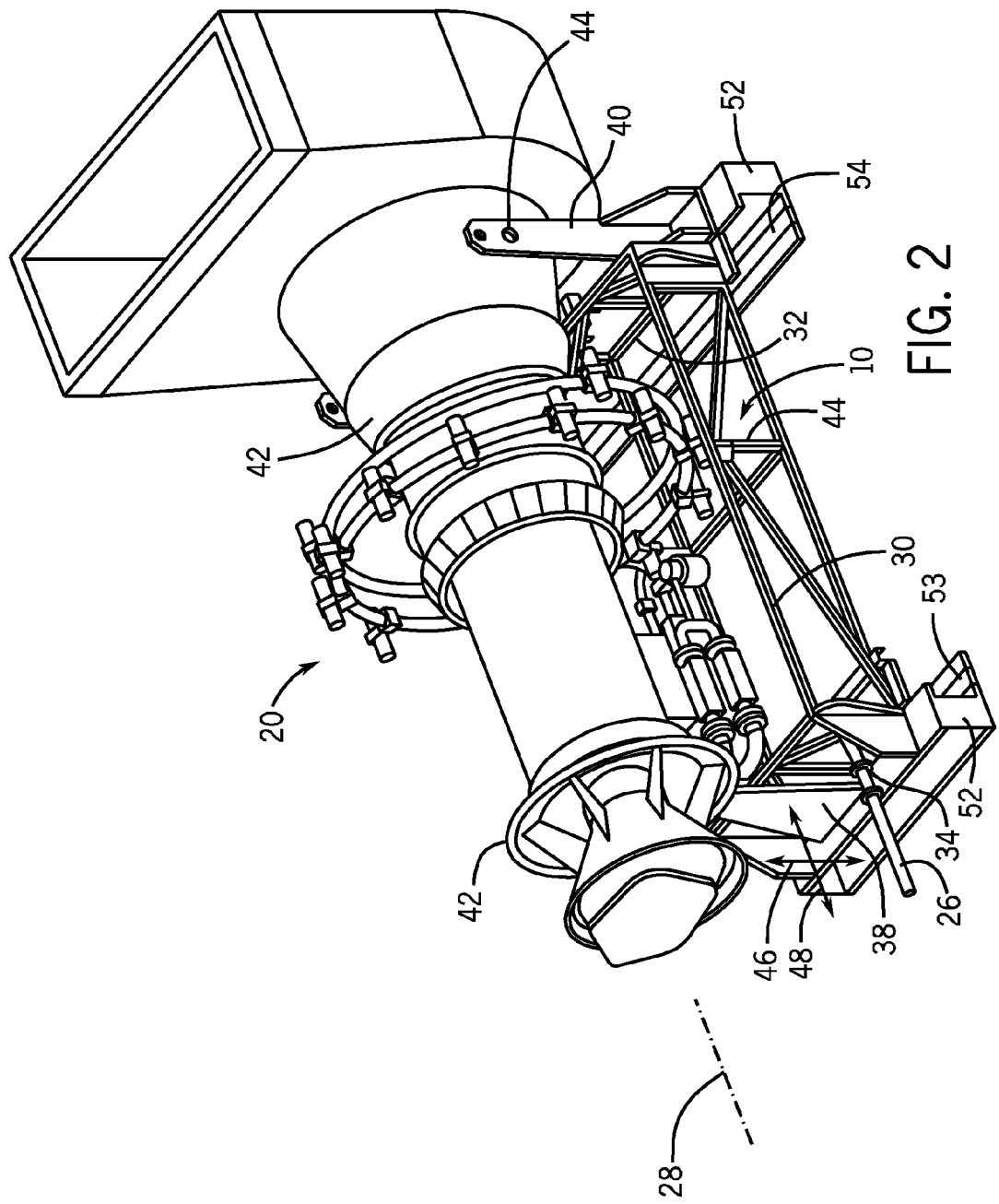
FIG. 2 is a schematic perspective view of a gas turbine engine supported by a multipurpose gas turbine support frame.

FIG. 2 is a perspective view of a gas turbine engine 20 supported by the support frame 10. In general, the support frame 10 is described in FIG. 1. In addition, the support frame 10 includes one or more flexible plates 38 and rigid supports 40 which attach to and support a gas turbine outer casing 42 connecting the gas turbine engine 20 to the support frame 10. The support frame 10 is in turn supported by a mount 52 which connects to the ground. The flexible plate 38 may be a support structure that includes a network of tie rods which support one end of the gas turbine engine during operation. For example, in a typical aero-derivative turbine the flexible plate 38 is actually two independent front mounts. As illustrated, however, the flexible plate 38 is a flat section of rigid material usually used in more heavy-duty gas turbine engines 20. In any case, the flexible plate 38 is oriented perpendicular to the axis of rotation 28 of the turbine and is typically attached securely to the first end 32 and/or second end 34 of the support frame 10. In certain embodiments, one or more sides of the flexible plates 38 may be attached to the cross members 50. The flexible plates 38 may be attached to the support frame 10 using a number of different methods, for example the flexible plates 38 may be welded or bolted to the support frame 10. In another embodiment, the flexible plates 38 may be configured to attach to the support frame 10 at one or more of several different locations, providing adaptability to systems that may benefit from more, or less, support depending on the operation. Likewise, the flexible plates 38 may be configured to attach to more than one location along the gas turbine outer casing 42.

The flexible plates 38 are relied upon to support the gas turbine engine 20 during operation. The flexible plates 38 support a large amount of weight along the vertical direction 46 while at the same time being able to bend slightly in an axial direction 48. The flexible plates 38 restrain the casing 42 during operational scenarios that benefit from elasticity, such as thermal growth of the casing 42 in the forward and aft directions along arrow 48. The flexible plates 38 also support the gas turbine engine 20 when it is subjected to other forces such as thrust, torque, vibration, and blade out loads generated during engine start up and operation.

The rigid supports 40 are also attached to the gas turbine outer casing 42 connecting the gas turbine engine 20 to the support frame 10. The rigid supports 40 connect to the outer casing 42 for example by a rigid support pin 44. The rigid supports 40 differ from the flexible plates 38 in that they are not meant to allow the gas turbine engine 20 to move except for thermal expansion of the casing 42 in the radial direction. The bulk of the utility of the rigid supports 40 is described in connection with FIG. 3. The flexible plates 38 and rigid supports 40 are added during the assembly of the gas turbine engine 20. Incorporation of support during the initial assembly and installation of the gas turbine engine 20 reduces transfer time and speeds the process by which the gas turbine engine 20 starts producing revenue.

During operation, the support frame 10 is anchored to a mount 52. The mount 52 in the illustrated embodiment includes a first beam 53 and a second beam 54 securely fastened to the ground opposite from one another. As illustrated, the mount 52 supports the ends 32, 34 of the support frame 10. This enables the gas turbine engine 20 and frame to be lifted and removed from in between the beams 53, 54. In other embodiments, the beams of the mount 52 may extend significantly more toward the middle of the support frame 10, thus diminishing the stress load on the middle of the support frame 10. In certain embodiments, the mount 52 may also support the support frame 10 from the middle thus leaving the ends 32, 34 of the support frame 10 open for lifting and removing the support frame 10 and gas turbine engine 20. Using a multipurpose support frame with flexible plates and rigid supports eliminates the need for multiple transfers of the turbine engine between support frames during the various stages of overhaul of the engine (e.g., removal, transport, etc.). The multipurpose support frame in connection with a mount also enables a faster engine exchange during overhaul by reducing down time, while also minimizing revenue losses from the downtime.

Figure 3:
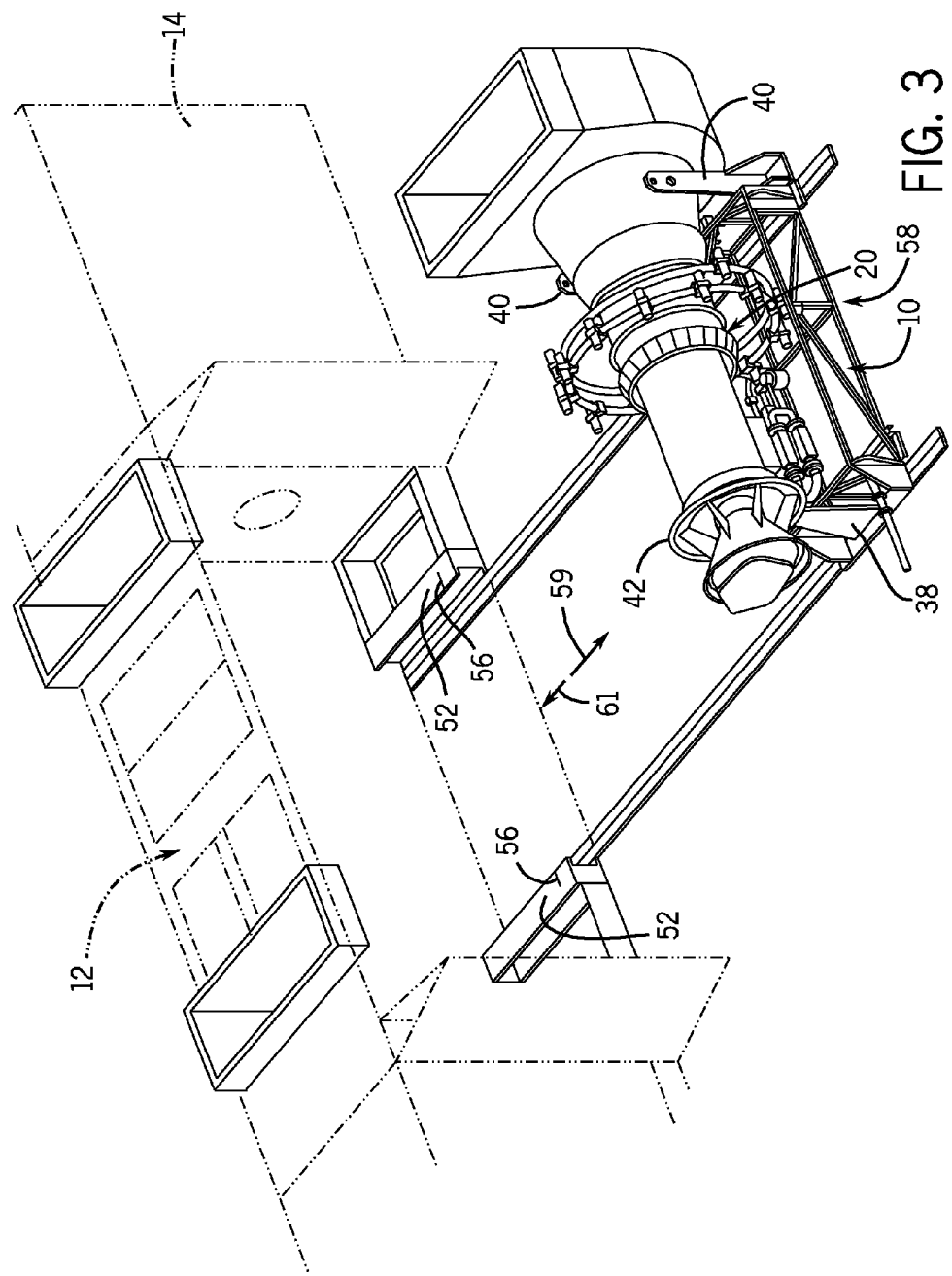
FIG. 3 is a schematic perspective view of an embodiment of a gas turbine engine having just been removed and/or about to be installed/reinstalled into a gas turbine enclosure.

FIG. 3 is a schematic perspective view of an embodiment of the gas turbine engine 20 having just been removed and/or about to be installed/reinstalled into a gas turbine enclosure. As depicted, the gas turbine engine 20, still connected to the support frame 10, is free of the enclosure 12 and disconnected from the electrical generator 14. To remove the gas turbine engine 20 in order to transport it to overhaul, the support frame 10 is lifted from the underside 58 and slid from the mount 52 in direction 59. Conversely, to install and/or reinstall the gas turbine engine 20, the support frame 10 is moved in the direction 61 opposite direction 59 and lowered on to mount 52. The removal and installation of the support frame 10 is accomplished by the use of an engine dolly (not shown). The engine dolly is designed to remain at the place of operation and is used to raise and lower the support frame 10 while it is fitted into place or taken out of place. In certain embodiments, the installation/reinstallation of the support frame 10 with the gas turbine engine 20 may use the engine dolly in conjunction with a combination of guides and dowels to ensure the frame 10 and engine 20 are precisely located. For example, during the installation/reinstallation of the gas turbine engine 20, the support frame 10 along with the gas turbine engine 20 is moved by the engine dolly in the direction 61 until it hits a stop. Upon hitting the stop, the support frame 10 with the engine 20 may be lowered onto one or more dowel pins (e.g., located on the mounts 52) to locate one end of the frame 10, while the other end of the frame 10 may be lowered adjacent a locating guide (e.g., guides 56 located on the mounts 52) to fix the orientation of the frame 10. Also, outside of the enclosure, the support frame 10 enables the transport and testing of the gas turbine engine 20 without having to transfer the gas turbine engine 20 to another support.

Once removed from the position of operation, the support frame 10 is configured to transport the gas turbine engine 20. Thus, the gas turbine engine 20 does not need to be transferred to another support for transport. For transport of the gas turbine engine 20, the rigid supports 40 will restrain the gas turbine engine 20 while it is exposed to transportation loads. The rigid supports 40 may remain in place throughout the overhaul process and also support the gas turbine engine 20 during assembly, disassembly, reassembly and testing of the gas turbine engine 20. The rigid supports 40 are configured to keep the gas turbine engine 20 completely stationary (except for ballooning due to thermal expansion), as opposed to the flexible support plates 38 that bend when under stress caused by elongation during operation of the gas turbine engine 20. As illustrated, the rigid supports may extend significantly up the side of the outer casing 42 (e.g., halfway). Additionally, in other embodiments the rigid supports 40 may attach at the bottom of the outer casing 42, relying on the strength of the casing and the strength of the attachment to maintain a rigid hold. It is also contemplated that the rigid supports 40 may extend completely over the gas turbine engine 20 to maintain complete hold over the outer casing 42. During transport (as opposed to removal from the position of operation), the support frame 10 is configured to be lifted by a crane or any other transportation mechanism or lift.

The support frame 10, including the rigid supports 40, is configured to couple to the mount 52 using highly accurate locating guides 56. These locating guides 56 enable quick removal and/or installation/reinstallation of the gas turbine engine 20. After an initial calibration procedure in which the locating guides 56 are set, the overhauled gas turbine engine 20 may be installed with minimal to no realignment. The locating guides 56 may be pins or bolts that are secured in place after the gas turbine engine 20 is slid into a relatively close position. In another embodiment, the locating guides 56 may be snap connections that lock in place once the correct position has been reached. In still other embodiments, the locating guides 56 may include laser sights that discern various positions all over the gas turbine engine 20 in order to quickly align the support frame 10 perfectly.

Figure 4:
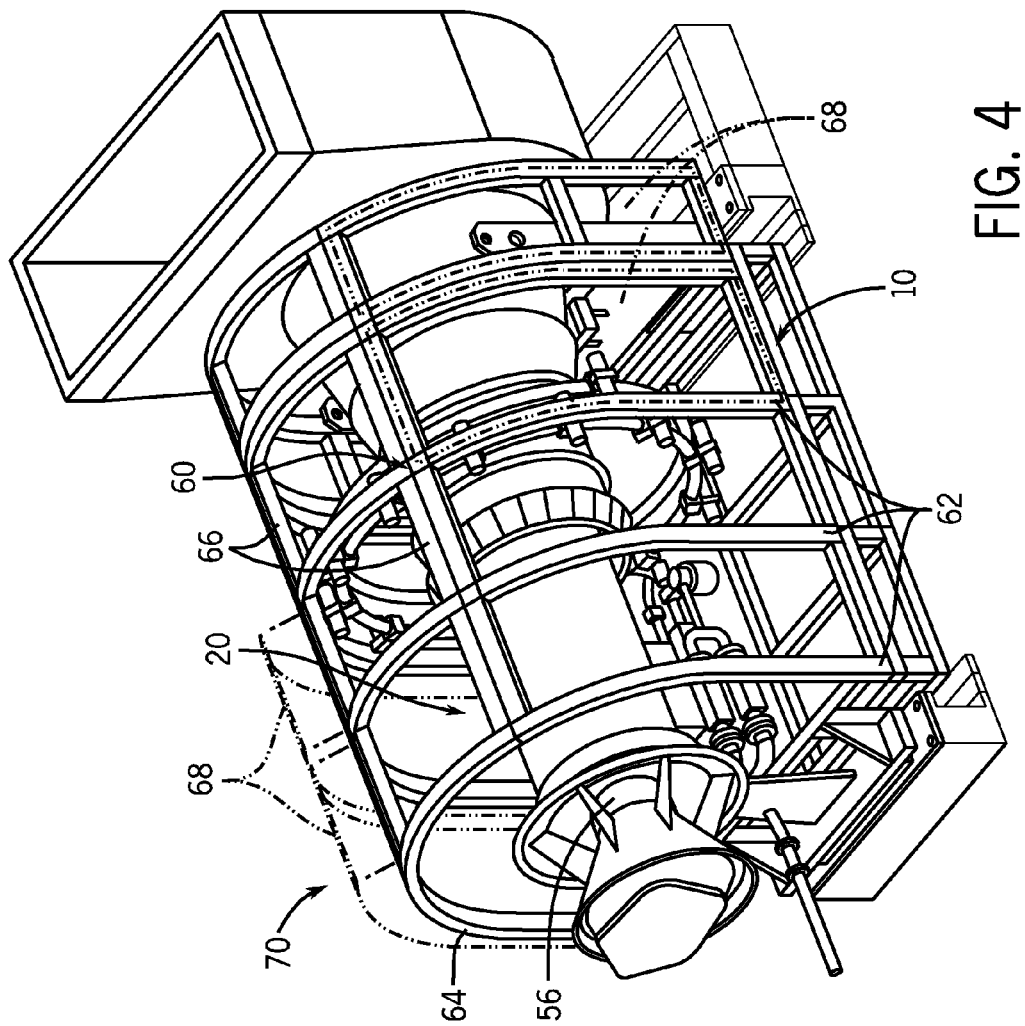
FIG. 4 is a perspective view of an embodiment of a gas turbine engine supported by a multipurpose gas turbine support and surrounded by a tubular framework.

FIG. 4 is a perspective view of an embodiment of the gas turbine engine 20 supported by the multipurpose gas turbine support frame 10 additionally surrounded by a tubular framework 60. The tubular framework 60 is coupled (e.g., bolted or welded) to the support frame 10. The tubular framework 60 includes a skeletal formation of beams 62 that surrounds or encases a portion of the gas turbine engine 20. In the illustrated embodiment, the beams 62 include two types: curved 64 and straight 66. The curved beams 64 attach to the support frame 10 and extend vertically from either side of the gas turbine engine 20 curving over the top to enclose the gas turbine engine 20. The straight beams 66 connect the curved beams 64 to one another for stability and protection. While the illustrated embodiment is certainly a "tubular" framework 60, the curved beams 64 forming a u-shape, the tubular framework 60 may include other shapes. For example, the beams 64 may form a triangle above the gas turbine engine 20, making an A-frame design. Or perhaps the beams 64 may be squared off to form a box. It will be appreciated as well that the cross-section of each individual beam 62 may vary in size and shape. For example, the cross-section of the illustrated beams 62 in FIG. 4 is a square or triangle of roughly 2 to 10 centimeters. In a different embodiment, however, the cross-section may be rounded or L-shaped. In constructing the tubular framework 60, the beams 62 are spaced to balance accessibility and protection of the gas turbine engine 20 during operation and transport.

Enclosure panels 68 may be secured to the exterior of the tubular framework 60 to create a tight fit enclosure 70 around the gas turbine engine 20. The enclosure panels 68 follow the curvature of the beams 62 of the tubular framework 60 to provide a relatively air-tight volume. Panels 68 may be manufactured to fit between two beams 62 so that attachment to the beam 62 may be the most secure. With this design, the enclosure panels 68 may be the same size, or different sizes. Additionally, the panels 68 may be constructed out of a number of different materials. For example, enclosure panels 68 made of acoustic noise dampening material may be utilized during operation of the gas turbine engine 20. During transport, however, the noise dampening enclosure panels 68 may be switched for enclosure panels 68 made of more protective or durable material such as steel or aluminum.

The tight fit enclosure 70 replaces any need for a free standing enclosure 12 that may surround the gas turbine engine 20 at the time of operation, transport, testing, etc. The tight fit enclosure 70 may enclose merely the gas turbine engine 20, compacting significantly the space required to operate the gas turbine engine 20. The tight fit enclosure 70 may contain any noise within allowable limits. Additionally, it may contain any leaked atmosphere to within the reduced enclosure limits utilizing seals against the inlet volute and exhaust collector portions of the gas turbine engine 20. The tight fit enclosure 70 allows the gas turbine engine 20 and the support frame 10 to be efficiently transported without any need for a separate transport enclosure. The tight fit enclosure 70 protects the gas turbine engine 20 from atmospheric elements as well as mechanical harm that may arise from transport to the overhaul location. Since the tight fit enclosure 70 is already in place upon removal of the support frame 10 and the gas turbine engine 20, the time it takes to get ready for transport is significantly reduced.

Once the gas turbine engine 20, support frame 10, and tight fit enclosure 70 have arrived at the overhaul location, the enclosure panels 68 and/or the tight fit enclosure 70 may be removed to facilitate any maintenance. Removal of the enclosure panels may allow for maintenance such as side casing of the compressor or combustion premixer removal. Enclosure panels 68 may also include access openings to provide access for minor maintenance to the gas turbine engine 20 during borescope and other simple inspection operations.

Figure 5:
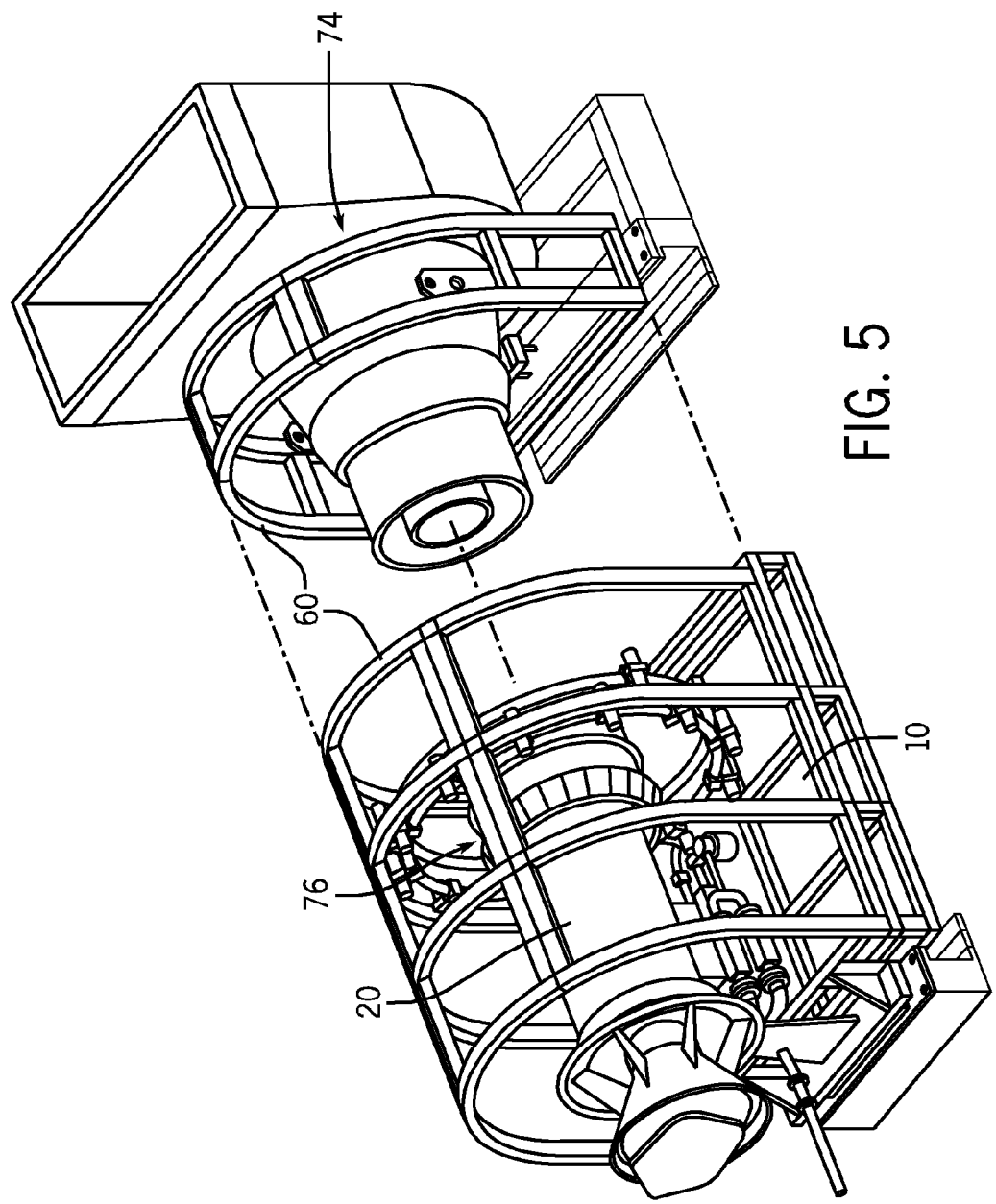
FIG. 5 is a view of an embodiment of portions of the gas turbine engine and the tubular framework of FIG. 4 separated from each other.

FIG. 5 is a view of an embodiment of portions of the gas turbine engine 20 and the tubular framework 60 of FIG. 4 separated from each other. The illustrated embodiment further clarifies the utility of the support frame 10 and tubular framework 60 after removal of either or both of the power turbine portion 74 and the gas generator portion 76 of the gas turbine engine 20 from the operating location. The support frame 10 and tubular framework 60 are constructed in multiple parts, each of which independently supports a different section of the gas turbine engine 20. The multiple parts of the support frame 10 may be couple to multiple parts of the tubular framework 60 while supporting a part of the gas turbine engine 20. For example, the support frame 10 supports the power turbine portion 74 independently of the gas generator portion 76. Likewise, the tight fit enclosure 70 encloses the power turbine portion 74 independently from the gas generator portion 76. During normal operation, the multiple pieces of the support frame 10 are securely coupled to facilitate normal operation of the gas turbine engine 20. Coupling of pieces 74 and 76 may be done by bolting, dowelling, or some other method that allows quick detachment while providing a secure bond that holds up to the stress of operation of the gas turbine engine 20. Upon removal of the support frame 10 from the position in which it operates, the engine dolly mentioned above facilitates the split of the power turbine portion 74 from the gas generator portion 76. Independent support of the power turbine portion 74 allows it to be maintained separate and apart from the gas generator portion 76. This translates into saved time and expense since one or the other portions may not undergo shipment, or the two portions may be shipped to different locations to halve the overhaul time.

Figure 6:
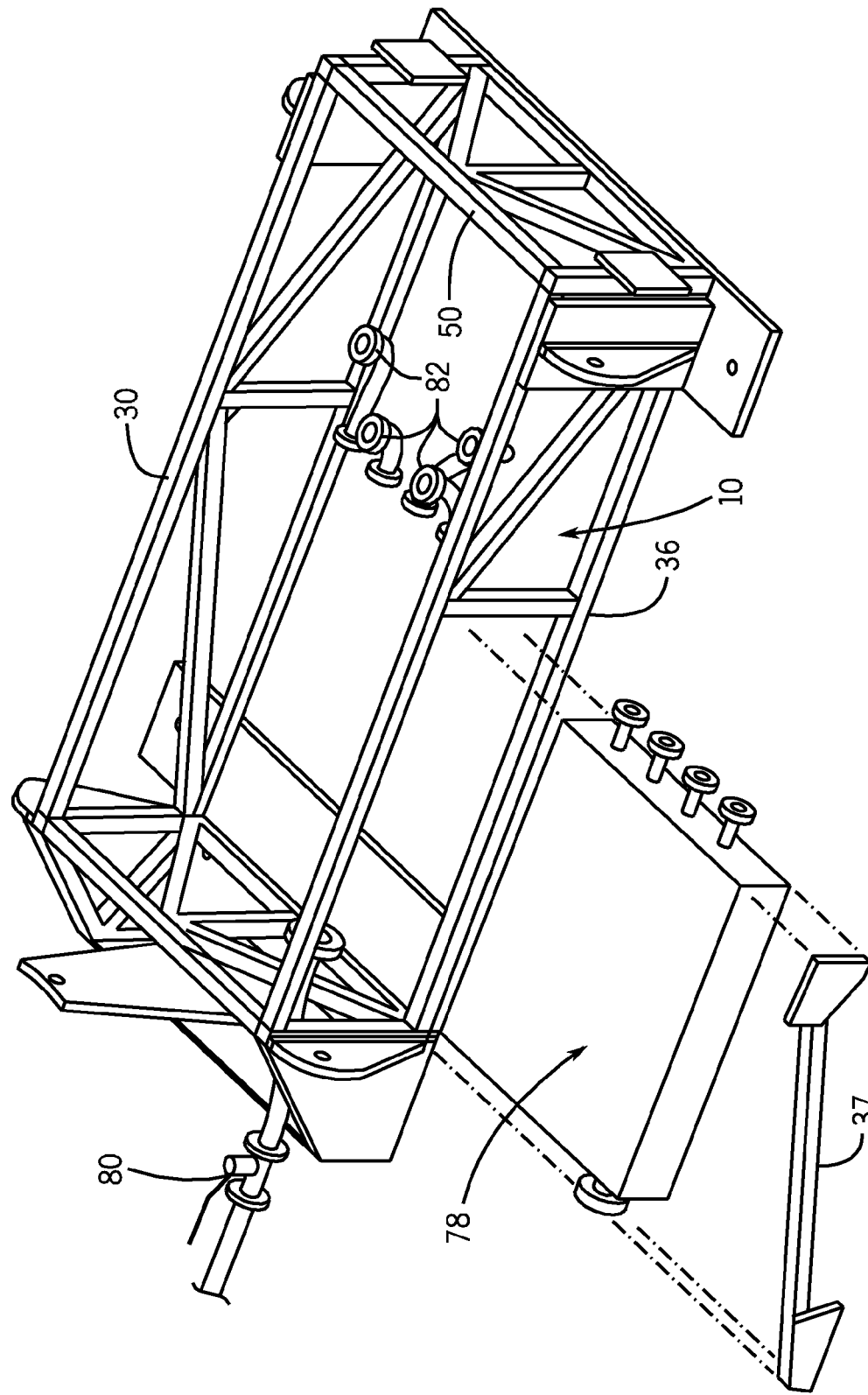
FIG. 6 is a perspective view of an embodiment of a multipurpose gas turbine support frame having the gas fuel metering system shut-off valves, and various other components being removed from and/or installed into the frame.

FIG. 6 is a perspective view of an embodiment of a multipurpose gas turbine support frame 10 having a gas fuel metering system and shut-off valves removed from and/or being installed into the frame. The support frame 10 with raised cross members 50 create space beneath the gas turbine engine 20, such that there may be room for a gas fuel metering system 78. The gas fuel metering system 78 is a collection of instruments that run the gas turbine engine 20. It may contain, among other things, the gas fuel manifold, staging, metering, vent and shut-off and check valves, pressure transmitters, and electrical disconnect panels. All of these may be enclosed entirely within the support frame 10. The gas fuel metering system 78 is coupled to the electrical and fluid lines 80 to supply electricity to the sensors and supply the fuel to the combustion section of the gas turbine engine 20. Since it is a grouping of instruments, it may be placed in one small area of the support frame 10. For example, it may be conveniently located away from the heat of the gas turbine engine 20 to allow for faster and thermally protected disconnects and reconnects during gas turbine exchange. The embodiment shows the fluid and electrical connections 80 coming into the support frame 10 from one consolidated location. The connections 80 are connected to the gas fuel metering system 78, which contains instruments and sensors used for operation of the gas turbine engine 20. Valve connections 82 connect the gas fuel metering system 78 to the gas turbine engine 20.

The embodiment in FIG. 6 shows the valve connections 82 located together in one convenient location. Angled raised supports 37 may be removed to allow the detaching of the valve connections 82 from the gas fuel metering system 78. The gas fuel metering system 78 may then be removed completely from the support frame 10. Once removed, the gas fuel metering system 78 may be independently transported or may remain at the location of operation while the gas turbine engine 20 is sent away for overhaul and maintenance. Independent removal and transport allows the gas fuel metering system 78 to be used in combination with a new and different gas turbine engine 20. This is useful in the instance that the gas fuel metering system 78 and the gas turbine engine 20 have not worn out concurrently. After overhaul is complete, either for the new gas turbine engine 20 or for the same gas turbine engine 20, the gas fuel metering system 78 is replaced within the support frame 10 and the angled raised support 37 is then replaced, putting the gas turbine engine 20 in a state ready for operation.

Technical effects of the invention include supporting a gas turbine engine 20 through the use of a multipurpose gas turbine support frame 10 during operation and throughout the entire overhaul process. The support frame 10 supports the gas turbine engine 20 during operation, removal, transportation, testing, and reinstallation. Separate parts of the gas turbine engine 20 may be split off and maintenance may be done, for example, to the power turbine portion 74 or the gas generator portion 76. The support frame 10 may also include a tubular framework 60. Also, the system includes a gas fuel metering system 78 that may be removed from the support frame 10 independently from the rest of the structure to allow it to stay in operation, or go with the gas turbine engine 20 to overhaul. The multipurpose support frame described above eliminates multiple transfers of the turbine engine between support frames during the various stages of overhaul of the engine (e.g., removal, transport, etc.). The multipurpose support frame described above also enables a faster engine exchange during overhaul by reducing down time, while also minimizing revenue losses from the downtime.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas turbine engine comprising a gas generator portion and a power turbine portion; and
   a multipurpose gas turbine support frame; and
   a framework directly coupled to and extending from the multipurpose gas turbine support frame, wherein the framework and the multipurpose gas turbine support frame together enclose at least the power turbine portion of the gas turbine engine between the framework and the multipurpose gas turbine support frame;
   wherein the multipurpose gas turbine support frame is coupled to the gas turbine engine and is configured to support the gas turbine engine during both operation and transport of the gas turbine engine, and wherein the framework and the multipurpose gas turbine support frame together enclose a majority of the gas turbine engine along a length of a longitudinal axis of the gas turbine engine between the framework and the multipurpose gas turbine support frame; and
   wherein the multipurpose gas turbine support frame comprises at least one rigid support extending vertically relative to the longitudinal axis and configured to restrain the gas turbine engine when exposed to transportation loads during transport of the gas turbine engine and to support the gas turbine engine, the at least one rigid support comprises a first end coupled to the multipurpose gas turbine support frame and a second end directly coupled to the power turbine portion of the gas turbine engine, and wherein the multipurpose gas turbine support frame comprises at least one flexible support extending vertically relative to the longitudinal axis and configured to restrain the gas turbine engine during operation of the gas turbine engine and to support the gas turbine engine, the at least one flexible support comprises a third end coupled to the multipurpose gas turbine support frame and a fourth end directly coupled to the gas generator portion of the gas turbine engine.

2. The system of claim 1, wherein the multipurpose gas turbine support frame is configured to support the gas turbine engine during removal of the gas turbine engine, and wherein both the framework and the multipurpose gas turbine support frame move with the gas turbine engine, while still enclosing the majority of the gas turbine engine, during removal of the gas turbine engine from a gas turbine enclosure.

3. The system of claim 1, wherein the multipurpose gas turbine support frame is configured to support the gas turbine engine during testing of the gas turbine engine.

4. The system of claim 1, comprising a gas fuel metering system coupled to the multipurpose gas turbine support frame, wherein the gas fuel metering system is configured to travel with the multipurpose gas turbine support frame during transport or removal of the gas turbine engine.

5. The system of claim 4, wherein the gas fuel metering system is configured to be removed from the multipurpose gas turbine support frame.

6. The system of claim 1, wherein the multipurpose gas turbine support frame comprises locating guides configured to enable installation or re-installation of the gas turbine engine without aligning or realigning the gas turbine engine.

7. The system of claim 1, comprising a plurality of panels disposed on the framework that encloses the gas turbine portion of the gas turbine engine within the framework.

8. The system of claim 1, wherein the framework is configured to enable independent separation and support of the gas generator portion or the power turbine portion when separated from the gas turbine engine.

9. The system of claim 1, wherein the framework comprises a U-shaped tubular framework.

10. A system, comprising:
    a multipurpose gas turbine support frame configured to couple to a gas turbine engine comprising a gas generator portion and a power turbine portion, wherein the multipurpose gas turbine support frame is configured to support the gas turbine engine during at least assembly, operation, transport, overhaul, and removal of the gas turbine engine; and
    a framework directly coupled to and extending from the multipurpose gas turbine support frame, wherein the framework and the multipurpose gas turbine support frame together are configured to enclose at least the power turbine portion of the gas turbine engine between the framework and the multipurpose gas turbine support frame, and wherein the framework and the multipurpose gas turbine support frame together are configured to enclose a majority of the gas turbine engine along a length of a longitudinal axis of the gas turbine engine between the framework and the multipurpose gas turbine support frame;
    wherein the multipurpose gas turbine support frame comprises at least one rigid support extending vertically relative to the longitudinal axis and configured to restrain the gas turbine engine when exposed to transportation loads during transport of the gas turbine engine and to support the gas turbine engine, the at least one rigid support comprises a first end coupled to the multipurpose gas turbine support frame and a second end configured to directly couple to the power turbine portion of the gas turbine engine, and wherein the multipurpose gas turbine support frame comprises at least one flexible support extending vertically relative to the longitudinal axis and configured to restrain the gas turbine engine during operation of the gas turbine engine and to support the gas turbine engine, the at least one flexible support comprises a third end coupled to the multipurpose gas turbine support frame and a fourth end configured to directly couple to the gas generator portion of the gas turbine engine.

11. The system of claim 10, wherein the multipurpose gas turbine support frame is configured to couple to a removable gas fuel metering system to enable travel of the removable gas fuel metering system with the multipurpose gas turbine support frame during transport or removal of the gas turbine engine.

12. The system of claim 10, wherein the multipurpose gas turbine support frame comprises locating guides configured to enable installation or re-installation of the gas turbine engine without aligning or realigning the gas turbine engine.

13. A system, comprising:
a gas turbine engine comprising a gas generator portion and a power turbine portion;
a multipurpose gas turbine support frame coupled to the gas turbine engine, wherein the multipurpose gas turbine support frame is configured to support the gas turbine engine during both operation and transport of the gas turbine engine; and
a framework directly coupled to and extending from the multipurpose gas turbine support frame, wherein the framework comprises a first framework portion that together with the multipurpose gas turbine support frame encloses at least a first portion of the gas generator portion of the gas turbine engine between the first framework portion and the multipurpose gas turbine support frame, and the framework comprises a second framework portion that together with the multipurpose gas turbine support frame encloses at least a second portion of the power turbine portion of the gas turbine engine between the second framework portion and the multipurpose gas turbine support frame, and wherein the first framework portion and the second framework portion are configured to directly contact each other when the gas generator portion is coupled to the power turbine portion, and wherein the framework and the multipurpose gas turbine support frame together enclose a majority of the gas turbine engine along a length of a longitudinal axis of the gas turbine engine between the framework and the multipurpose gas turbine support frame;
wherein the multipurpose gas turbine support frame comprises at least one rigid support extending vertically relative to the longitudinal axis and configured to restrain the gas turbine engine when exposed to transportation loads during transport of the gas turbine engine and to support the gas turbine engine, the at least one rigid support comprises a first end coupled to the multipurpose gas turbine support frame and a second end directly coupled to the power turbine portion of the gas turbine engine, and wherein the multipurpose gas turbine support frame comprises at least one flexible support extending vertically relative to the longitudinal axis and configured to restrain the gas turbine engine during operation of the gas turbine engine and to support the gas turbine engine, the at least one flexible support comprises a third end coupled to the multipurpose gas turbine support frame and a fourth end directly coupled to the gas generator portion of the gas turbine engine.

14. The system of claim 13, wherein the framework is configured to enable independent separation and support of the gas generator portion or the power turbine portion when separated from the gas turbine engine.

15. The system of claim 13, comprising a plurality of panels disposed on the framework that encloses at least the first portion of the gas generator portion or at least the second portion of the power turbine portion within the framework.

* * * * *